United States Patent
Sanders

[15] 3,672,335
[45] June 27, 1972

[54] METHOD AND APPARATUS FOR GATHERING AND CONFINING LIVE POULTRY

[72] Inventor: Dickerson H. Sanders, 170 Stanton Way, Athens, Ga. 30601

[22] Filed: Oct. 16, 1970

[21] Appl. No.: 81,377

[52] U.S. Cl. ..................................119/82, 56/328 R, 15/84
[51] Int. Cl. .......................................................A01k 29/00
[58] Field of Search......................119/1, 82, 153; 56/328 R; 15/84

[56] References Cited

UNITED STATES PATENTS

| | | | |
|---|---|---|---|
| 930,269 | 8/1909 | Conrath | 15/84 |
| 2,611,340 | 9/1952 | Manning | 119/82 |
| 3,021,661 | 2/1962 | Couberly | 56/328 R |
| 3,389,690 | 6/1968 | Jerome | 119/82 |
| 3,420,211 | 1/1969 | Hartvickson | 119/82 |

*Primary Examiner*—Aldrich F. Medbery
*Attorney*—Snyder and Butrum

[57] ABSTRACT

A mobile self-propelled gathering device is manually guided through an area having live birds therein. Pushing means is provided at the forward end of the gathering device and engages the birds from above and pushes the birds rearwardly onto a conveyor means which extends upwardly and rearwardly for conveying the birds away from the pushing means. The birds are discharged at the upper rear portion of the conveyor means downwardly onto a generally horizontally extending conveyor portion which in turn conveys the birds to a further conveyor portion extending to a vehicle from whence the birds are removed from the conveyor portion and placed in suitable shipping contains on the vehicle.

25 Claims, 11 Drawing Figures

3,672,335

INVENTOR
DICKERSON H. SANDERS

INVENTOR
DICKERSON H. SANDERS

PATENTED JUN 27 1972 3,672,335

INVENTOR

DICKERSON H. SANDERS

PATENTED JUN 27 1972 3,672,335

INVENTOR
DICKERSON H. SANDERS

METHOD AND APPARATUS FOR GATHERING AND CONFINING LIVE POULTRY

BACKGROUND OF THE INVENTION

The present invention relates to a method and apparatus for gathering live birds and in particular fowl such as chickens. Chickens are commonly grown in relatively large growing houses wherein the chickens are distributed at random throughout the growing house which may in a typical example be on the order of 300 feet in length. At certain time intervals, it is necessary to gather the chickens within such a growing house and place them in suitable shipping containers or coops for shipment to a processing plant.

The present invention is directed to a method and apparatus which is particularly suited for gathering chickens from the floor of a growing house wherein the chickens are conveyed from their position within the growing house outwardly thereof to a location such as a vehicle where they are placed in shipping containers.

The present practice is for a number of workmen to enter the growing house and remove the feeders and waterers. A portion of the chickens are then driven into a compact mass at one end of the growing house where they are held in place by a net so as to prevent the chickens from returning to the previously occupied part of the growing house. This type of procedure has proved to be unsatisfactory since the chickens have a tendency to stampede into one another and to fly into obstructions in the growing house and in general the chickens are bumped and bruised so as to cause a substantial amount of damage which, of course, reduces the quality of the meat thereby causing a substantial financial loss. After the chickens have been concentrated in one location and contained therein, the chickens are then caught by hand and the workmen carry about six chickens in each hand to a vehicle such as a truck where they are placed into coops for transport.

In an alternative procedure, the center aisle of the growing house is cleared of birds by driving them to the side walls after the feeders and waterers are removed. A fork-lift truck or the like is then employed to move the empty coops from the hauling truck to the cleared center aisle within the growing house. The birds are then caught by hand and placed in these coops which are then removed from the growing house and placed back on the truck by the fork lift and the like.

The above described procedures for manually gathering the chickens require a considerable amount of time and effort on the part of the workmen gathering the chickens. A relatively large number of workmen are required, and the chickens are usually damaged to a substantial extent during such operations.

SUMMARY OF THE INVENTION

In the present invention, a self-powered gathering device is provided which can be selectively manually operated by a single operator. The gathering device moves through an area of the growing house having live birds therein, and the gathering device is sufficiently maneuverable that it can move into all of the desired areas of the growing house and can work around obstacles such as supporting columns and the like.

The gathering device includes a pushing means at the forward end thereof which is adapted to engage the birds and to push the birds bodily in a rearward direction onto a conveyor means which extends upwardly and rearwardly of the gathering device. The pushing means resiliently engages the chickens from above and holds them down while pushing them rearwardly. The pushing means is so constructed as to minimize any possible damage to the birds and engagement from above is a particularly important feature since the birds are at rest on the floor of the growing house with their breasts on the floor. The breast is the area of the chicken which is most sensitive to damage and the pushing means engages the chickens from above so as to prevent as much as possible any direct contact with the breast area of the bird.

The pushing means is so designed that it effectively reaches over the chickens and pushes them to the rear while restraining them and preventing escape. The pushing means is also so designed that it will slide off of the chicken if it comes down directly on the chicken thereby to prevent any undue damage to the bird.

The pushing means moves the birds rearwardly onto a conveyor means which is moving at a faster linear speed than the pushing means to thereby produce a certain amount of spacing between the birds which allows cooling of the birds and prevents injury thereto.

The chickens are discharged from the upper rear portion of the conveyor means by a discharge portion onto further conveyor means which in turn carries the chickens outwardly of the growing house onto a suitable vehicle such as a truck whereat personnel grasp the birds from the conveyor means and place them in coops for shipment to a desired location.

The method and apparatus of the present invention enable the gathering of chickens within a growing house by substantially fewer men than are required to carry out prior art gathering operations thereby providing a substantial saving in labor costs. Additionally, the arrangement of the present invention enables the loading of chickens from the growing house into the shipping containers at a substantially faster rate while producing less damage to the birds.

DESCRIPTION OF THE PREFERRED EMBODIMENTS

Figure 1:
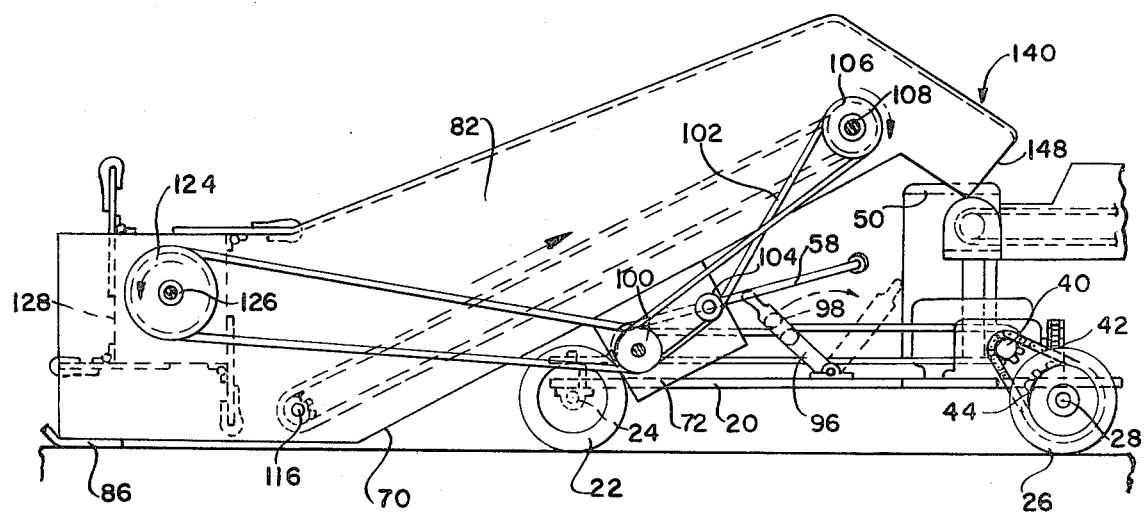
FIG. 1 is a side elevation of a gathering device according to the present invention.
Figure 2:
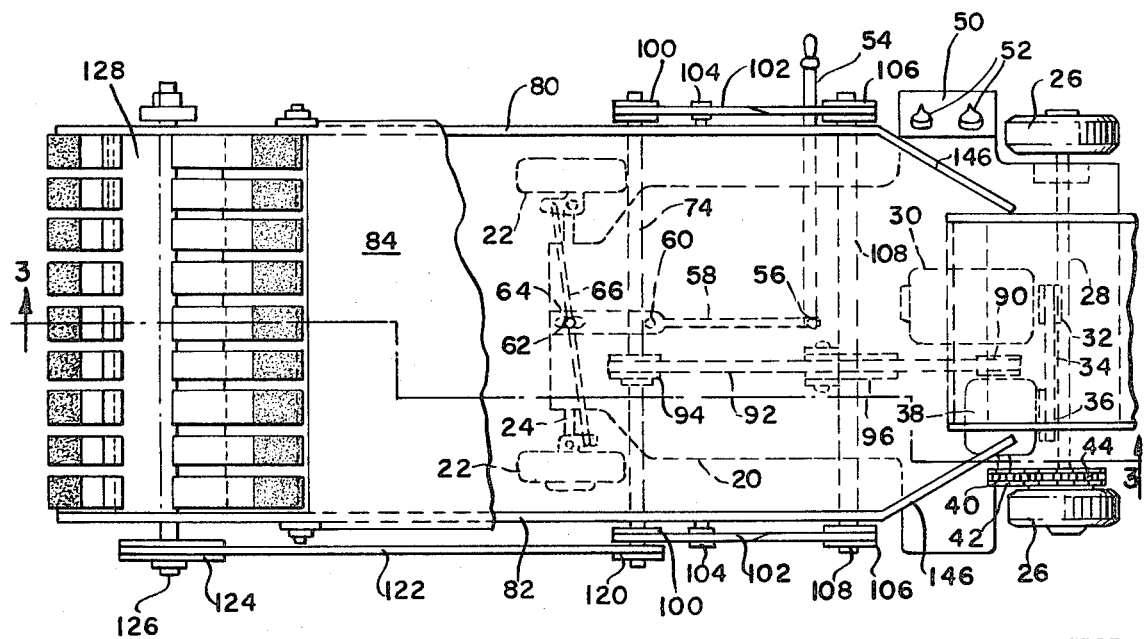
FIG. 2 is a top view partially broken away of the structure shown in FIG. 1.

Referring now to the drawings wherein like reference characters designate corresponding parts throughout the several views, a first form of gathering device according to the present invention is illustrated in FIGS. 1-5 inclusive. The gathering device includes a movable support portion or framework 20 supported by a forward pair of dirigible rubber tired wheels 22 supported on axle means 24 and a pair of rear rubber tired wheels 26 supported on axle means 28. The power means for operating the gathering device comprises an electric motor 30 supported on portion 20 and which may be either driven by batteries or a suitable source of electricity interconnected therewith by means of suitable electrical cable.

Motor 30 includes an output drive sprocket 32 interconnected by means of chain 34 with a drive sprocket 36 operatively connected with a gear reducer 38. This gear reducer includes a drive sprocket 40 interconnected by means of chain 42 with a sprocket 44 interconnected with axle means 28 for driving the rear wheels of the gathering device.

A control panel 50 is disposed at one side of the gathering device and includes a pair of manually operable control knobs 52 for controlling the speed of movement of the gathering means as determined by the speed of rotation of the rear wheels 26 as well as the direction of rotation of the wheels either in a forward or reverse direction. In addition, a handle or tiller 54 extends laterally of the gathering device in such a position as to be readily manipulated by an operator, this tiller serving to steer wheels 22 to determine the direction of movement of the gathering device. The inner end of tiller 54 is pivotally interconnected at point 56 with a member 58 which is in turn pivotally supported at point 60 on support portion 20. Member 58 includes an elongated slot 62 which receives a pin 64 interconnected with steering links 66 which are in turn connected to the dirigible wheels 22 whereby movement of tiller 54 is adapted to cause the front wheels of the gathering device to be moved in unison with one another in a conventional manner.

Figure 3:
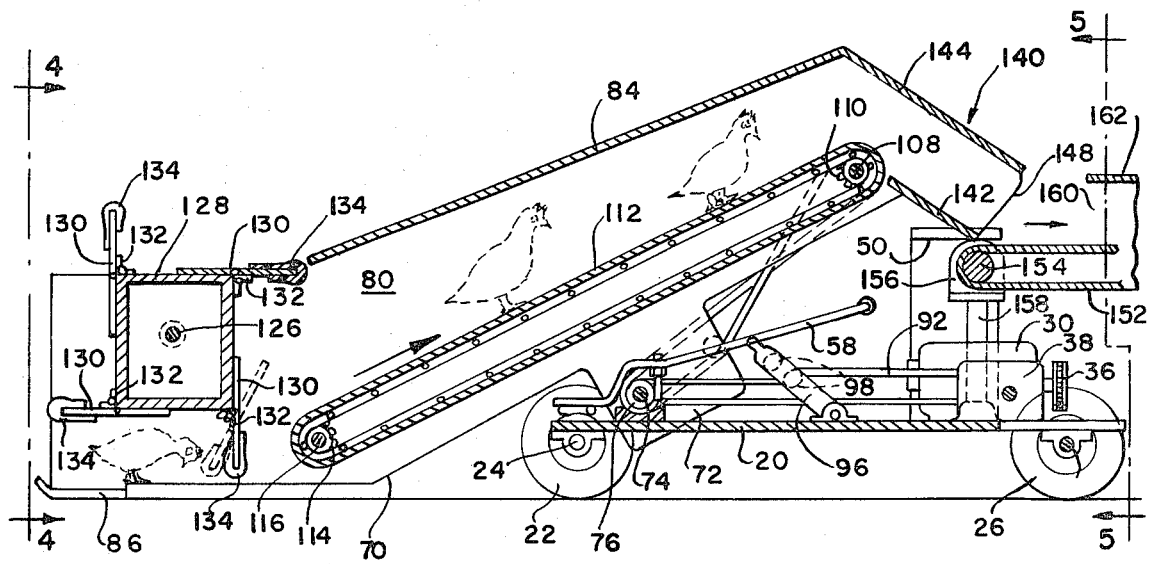
FIG. 3 is a sectional view taken substantially along line 3—3 of FIG. 2 looking in the direction of the arrows.
Figure 4:
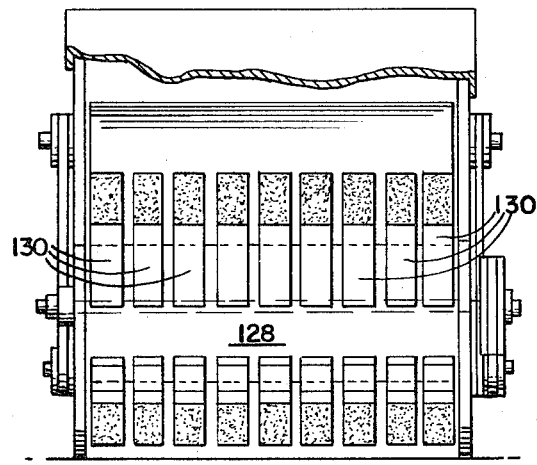
FIG. 4 is a view partially broken away taken substantially along line 4—4 of FIG. 3 looking in the direction of the arrows.
Figure 5:
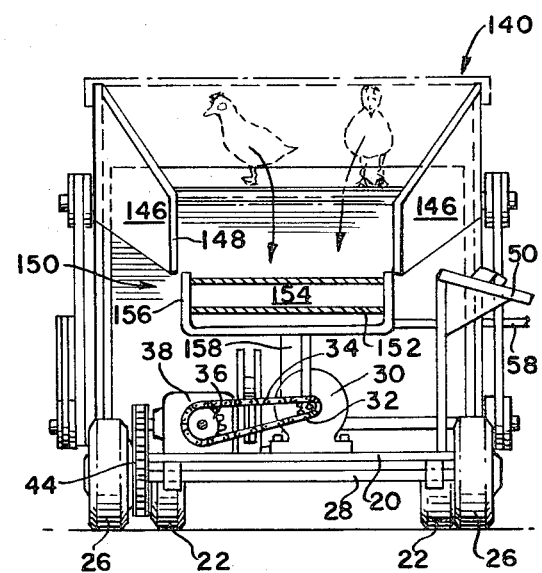
FIG. 5 is a sectional view taken substantially along line 5—5 of FIG. 3 looking in the direction of the arrows.

A swingable assembly 70 includes depending portions 72 at opposite sides thereof pivotally interconnected with a shaft 74 which in turn is rotatably supported within spaced bearings 66 mounted on support portion 20. In this manner, assembly 70 is mounted for swinging movement about support portion 20. Assembly 20 includes a pair of side walls 80 and 82 as well as a top wall 84. Top wall 84 is optional and may be eliminated in some cases. Skid means 86 is provided at the forward ends of the side walls 80 and 82 so that the swinging assembly is normally adapted to swing downwardly in a counter clockwise direction as seen in FIGS. 1 and 3 so that the forward end thereof will slide along the floor of a growing house or the like as the gathering device is moved from place to place.

Gear reducer 38 also includes an output pulley 90 which is interconnected by means of belt 92 with a pulley 94 affixed to shaft 74. A swingable lever 96 has a pair of rollers 98 supported thereon which engage belt 92, and swinging movement of lever 96 is adapted to provide a driving connection between the gear reducer and shaft 74 in one position of the lever and is adapted to disengage such drive in another position of the lever in a well-known manner.

A pair of drive pulleys 100 are connected with opposite ends of shaft 74. Crossed belts 102 extend around pulleys 100 and over idler pulleys 104, the belts also extending around driven pulleys 106 secured to opposite ends of a shaft 108. Drive sprockets 110 are secured to shaft 108 and are engageable with an endless conveyor belt 112 which passes around drive sprockets 110 at one end thereof and sprockets 114 at the lower end thereof, these latter sprockets rotating on a fixed shaft 116 extending between opposite side walls 80 and 82. It is apparent that drive belts 102 serve to drive endless conveyor belt 112 in the direction illustrated in the drawings.

A further drive pulley 120 is secured to the outer end of shaft 74 and is connected by a belt 122 with a pulley 124 secured to a shaft 126 which is rotatably supported by the forward ends of side walls 80 and 82. Shaft 126 is also secured to a box-like supporting frame 128 of generally rectangular cross-sectional configuration, this supporting frame having a plurality of spaced members supported thereby adapted to engage birds resting on the floor of the growing house.

The spaced members for engaging the birds include a plurality of arms 130 each of which is pivotally interconnected with supporting frame 128 and which is biased into the operative position shown in full lines by means of springs 132. The outer ends of each of these arms is provided with padding 134 formed of a suitable soft material such as polyurethane or the like so as to minimize damage to the chickens when the arms come into engagement therewith. If excess force is applied by the arms to the chickens, the arm may pivot from the full line position as shown in FIG. 3 to a dotted line position as shown therein to thereby minimize any possible damage to the bird. This pivoting movement will normally take place as the arms descend upon the top of a chicken whereby the arms are adapted to slide off of the chicken if the chicken is not in the proper position so as to be pushed toward the conveyor means by the arms. The padding of the arms may be eliminated in certain cases and the arms may be rigidly attached to the supporting frame instead of being pivotably interconnected therewith.

A discharge portion 140 is provided adjacent the upper rear end of the conveyor means, this discharge portion including a lower wall 142 along which chickens are adapted to slide as the conveyor belt reverses direction around sprockets 110. The discharge portion also includes a top wall 144 and a pair of converging side walls 146 defining a discharge opening 148 from which the chickens are discharged onto further conveyor means as hereinafter described. Top wall 144 is optional and may be eliminated in some cases.

A further conveyor indicated generally by reference numeral 150 includes an endless conveyor belt 152 extending around a roller 154 supported in a framework 156 which is pivotally connected with a vertically extending shaft 158 provided on support member 20. In this manner, one end of conveyor means 150 is pivotally interconnected with the gathering device with one end of conveyor means 150 disposed beneath the discharge portion of the gathering device for receiving birds therefrom. Conveyor means 150 also includes a pair of side walls 160 interconnected with a top wall 162 which provides a covered conveyor means which in cooperation with the covered conveyor portion of the gathering device insures that the birds will not escape from the conveying means. Top wall 162 is optional and may be eliminated in some cases.

Figure 11:
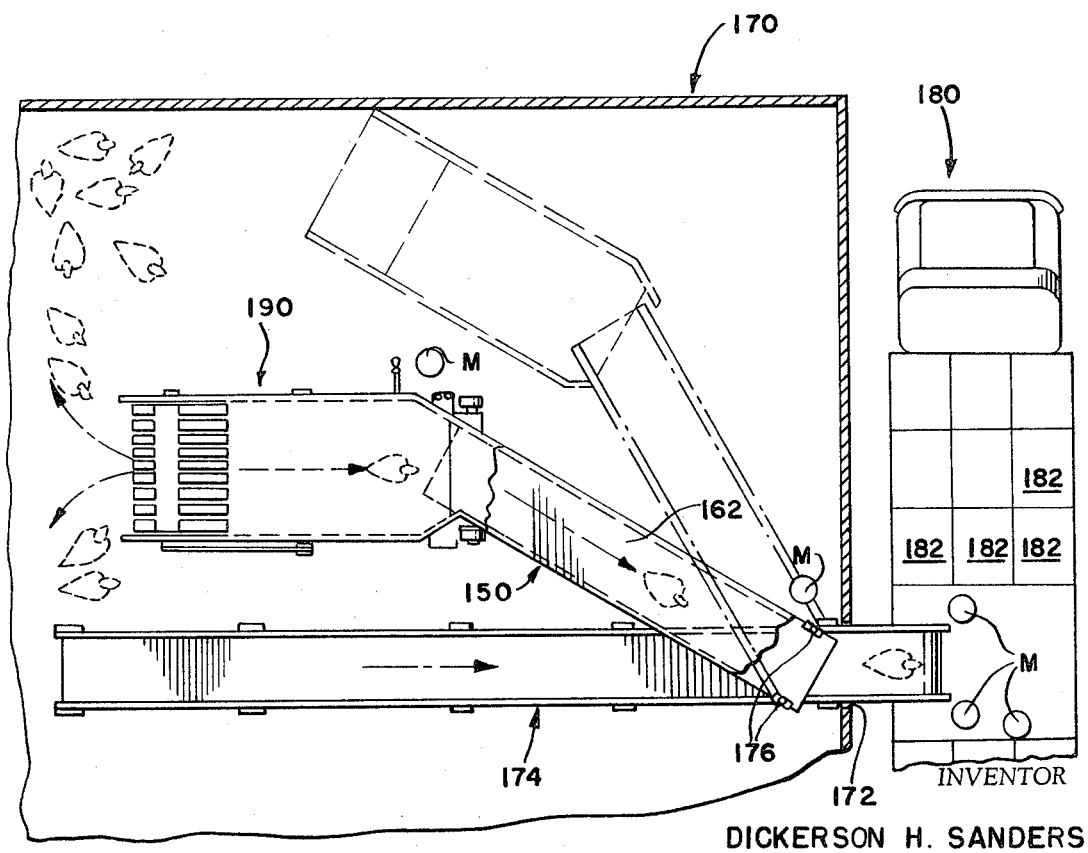

Referring now to FIG. 11, a growing house is indicated by reference character 170 and includes a door 172 at one end thereof. A suitable conveyor means 174 such as an endless belt or the like is provided and suitably driven in the direction as indicated by the arrow in this figure. An end of conveyor means 150 is movably interconnected with conveyor means 174 at points 176 whereby the gathering device and conveyor means 150 is adapted to be maneuvered and moved from place to place in the growing house while the conveyor means remain in operative associated relationship with one another. Conveyor means 174 may also be a covered conveyor so as to insure that the birds will not escape therefrom as they are being moved out of the growing house.

Conveyor means 174 extends to an intermediate portion of a suitable vehicle 180 such as a truck or the like which is adapted to carry the chickens to a remote point for processing. A plurality of shipping containers such as chicken coops 182 are provided on the truck and a plurality of men indicated by reference character M in FIG. 11 are positioned on the truck adjacent the outer end of conveyor means 174 for manually grasping the chickens from the conveyor means and placing them in suitable chicken coops which are then stacked in position on the truck. It is contemplated that it will ordinarily require three men to carry out this function. In addition, a man is positioned within the growing house at a point where conveyor means 150 and 174 are interconnected with one another to insure that the two conveyor means will remain in operative relationship with one another while allowing conveyor means 150 to move axially along conveyor means 174. A further man, as indicated by reference character M, is positioned adjacent the gathering device for manually controlling the direction and speed of movement of the gathering device.

In operation, the crew enters the lighted chicken house after sunset and places conveyor means 174 along the center aisle of the house, and this conveyor means may include inclined portions so as to elevate the chickens to the bed of the truck. Conveyor means 150 is then operatively associated with conveyor means 174 while the gathering device indicated generally by reference character 190 rests upon the floor of the house. The lights in the house are then extinguished causing the birds to be at rest on the floor of the house. The gathering device is then manually controlled by an operator who directs the gathering device through an area having live birds therein.

As the gathering device moves through the live birds, the pushing means at the forward end of the gathering device pushes the birds bodily in a rearward direction onto the conveyor means of the gathering device. The birds are pushed in a rearward direction from above and in a resilient manner so as to prevent damage to the birds. The birds are held down while they are being pushed rearwardly to restrain the birds to prevent escape from the gathering device. The plurality of arms on the pushing device serves to gently penetrate a group of packed birds and prevents damage thereto.

The birds are moved by the pushing means onto the lower portion of the conveyor means of the gathering device whereupon the birds are carried upwardly and rearwardly away from the pushing means. The conveyor means is driven at a linear speed substantially greater than that of the pushing means so that the birds will be spaced from one another along the conveyor means.

The birds are discharged through the discharge means at the upper rear end of the conveyor means downwardly onto conveyor means 150 whereupon the birds are then carried laterally to conveyor means 174 and thence outwardly of the chicken house to the truck or the like. The birds are then removed from the conveyor means 174 and placed in the shipping containers on the truck.

It is evident that the entire gathering procedure can be carried out by five men rather than requiring approximately nine men as has been the common practice in the prior art. The birds can be loaded must faster and with considerably less damage to the birds.

Figure 6:
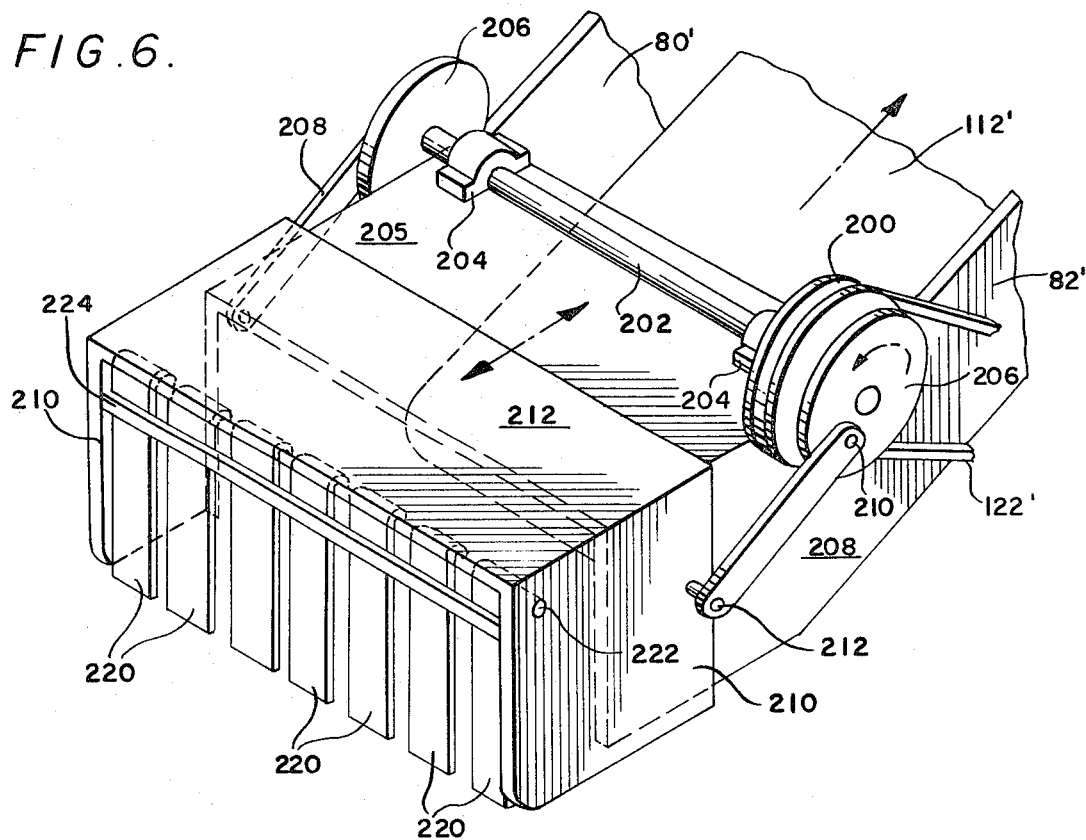
FIG. 6 is a top perspective view of a modified form of the invention.
Figure 7:
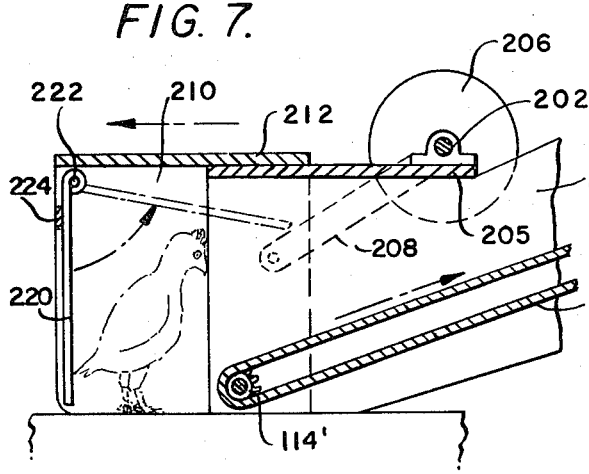
FIG. 7 is a sectional view through the structure shown in FIG. 6 illustrating one operative position.
Figure 8:
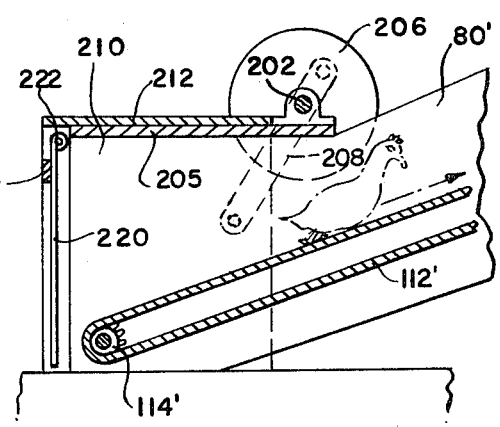
FIG. 8 is a view similar to FIG. 7 illustrating another operative position.

Referring now to FIGS. 6–8, a modified form of the invention is illustrated wherein the gathering device is substantially identical with that previously described with the exception that the pushing means has been modified in this embodiment. Parts similar to those previously described will be given the same reference numerals primed.

In this form of the invention, belt 122' drives a pulley 200 affixed to a shaft 202 journalled in spaced bearings 204 supported on a horizontal top wall 205 supported between the opposite side walls 80' and 82'.

A pair of disc-like members 206 are affixed to the outer ends of shaft 202 and have links 208 pivotally connected at points 210 spaced from the axis of rotation of members 206, the opposite ends of links 208 being pivotally interconnected at points 212 with opposite side walls 210 of a reciprocable assembly including a top wall 212 extending between side walls 210 and interconnected therewith. It is apparent that upon rotation of shaft 202 and disc-like members 206 during operation of the device, links 208 will produce reciprocation of the portion including side walls 210 and top wall 212.

A plurality of spaced members 220 are pivotally supported by a cross shaft 222 at the forward open end of the reciprocable portion, members 220 being free to swing in a rearward or counter clockwise direction as seen in FIGS. 6 and 7 and being restrained against movement in a forward or clockwise direction by a cross bar 224 extending between opposite sides 210 of the reciprocable portion.

In operation, as the gathering device is moved through an area having live birds therein, the reciprocable portion will continuously reciprocate. As the reciprocable portion moves forward, arms 220 are adapted to swing in a rearward direction so as to pass over any chickens in the path of movement whereupon members 220 will swing downwardly into the position as shown in FIG. 7. Subsequent movement of the reciprocable portion in a rearward direction will cause any birds disposed at the inner side of members 220 to be pushed rearwardly onto the conveyor belt 112' since members 220 cannot swing forwardly as the reciprocable portion is moving in a rearward direction. This pushing means will continue to carry out this cycle of movement during operation of the apparatus.

Figure 9:
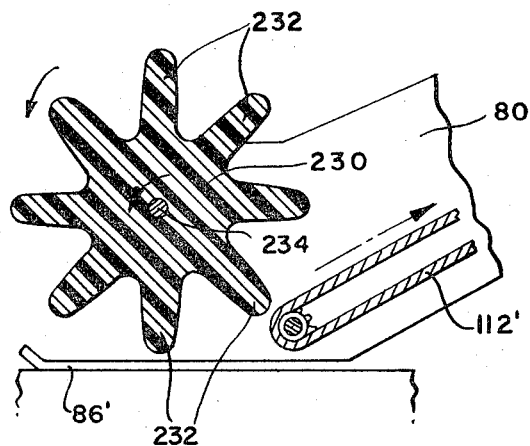
FIG. 9 is a sectional view through still another form of the invention.

Referring now to FIG. 9 of the drawings, a further modified form of the invention is illustrated wherein the gathering device may be substantially the same as that previous described with the exception of the pushing means. In this form of the invention, the pushing means 230 comprises a body of resilient material such as a medium density closed pore polyurethane foam having integral projections 232 extending radially outwardly thereof. The pushing means is mounted on a shaft 234 adapted to roatate in the direction as indicated by the arrows so as to engage birds and push them rearwardly onto the conveyor means.

Figure 10:
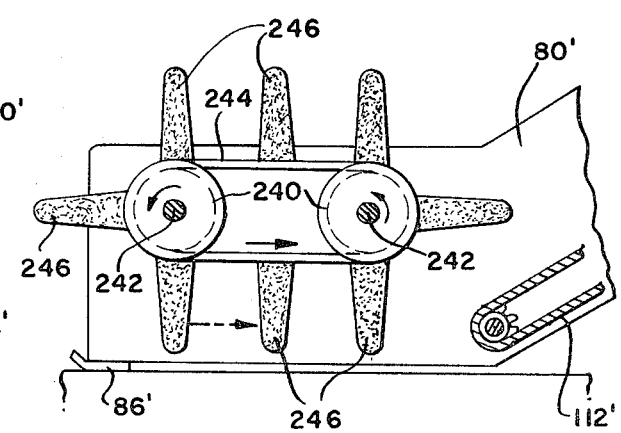
FIG. 10 is a sectional view through yet another modification of the invention; and, FIG. 11 is a top somewhat schematic view illustrating the manner in which the present invention is employed for gathering chickens in a growing house.

Referring now to FIG. 10 of the drawings, still another form of the invention is illustrated wherein the gathering device is identical with that previously described with the exception of the pushing means. In this embodiment, the pushing means includes a pair of pulleys 240 mounted on shafts 242 which are driven in the direction indicated by the arrows. A belt 244 passes around the pulleys and includes outwardly extending projections 246 which are adapted to engage birds and push them rearwardly onto the conveyor means.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. The method of gathering live birds comprising moving a gathering device through an area having live birds therein, engaging the birds with a portion of said gathering device and pushing the birds bodily onto a conveying means, conveying the birds away from said portion of the gathering device, moving the birds to a location remote from said gathering device and confining said birds at said remote location.

2. The method as defined in claim 1 including the step of selectively manually controlling the position of said gathering device.

3. The method as defined in claim 1 wherein the birds are held down while being pushed bodily onto said conveying means.

4. The method as defined in claim 1 wherein the birds are pushed from above.

5. The method as defined in claim 1 wherein the portion of said gathering device engaging the birds engages the birds resiliently so as to prevent damage to the birds.

6. The method as defined in claim 1 including the step of engaging the birds with a plurality of spaced members so as to gently penetrate a group of packed birds to prevent damage thereto.

7. The method as defined in claim 1 wherein the birds are separated from one another when conveyed away from said portion of the gathering device.

8. The method as defined in claim 7 wherein the birds are moved away from said portion at a speed greater than the speed at which the birds are pushed onto the conveying means.

9. The method as defined in claim 1 wherein the birds are conveyed upwardly away from said portion of the gathering device.

10. The method as defined in claim 1 including the step of placing the birds in shipping containers at said remote location.

11. Apparatus for gathering and conveying poultry birds comprising a gathering device, said gathering device including a mobile support portion, means for manually controlling the position and location of said movable support portion, poultry contacting and pushing means supported at the forward end of said support portion for engaging birds, drive means for driving said pushing means in a direction to engage and gather the birds and push them rearwardly of the gathering device, and conveyor means supported by said support portion, said conveyor means including a leading edge adjacent to the rearwardmost path of movement of said pushing means to receive birds from the pushing means and to move the birds away from the pushing means and means to confine said poultry birds after they have been moved.

12. Apparatus as defined in claim 11 wherein said movable support portion includes wheels and power means whereby the movable support portion is self-propelled.

13. Apparatus as defined in claim 11 wherein said pushing means includes a plurality of spaced resilient portions to prevent damage to the birds when engaging the birds.

14. Apparatus as defined in claim 11 wherein said pushing means includes a plurality of pivotally mounted spaced arms, and means resiliently biasing said arms in one direction.

15. Apparatus as defined in claim 14 wherein said arms are moved along a circular path for engaging birds from above.

16. Apparatus as defined in claim 11 wherein said pushing means includes a plurality of spaced members, said spaced members being mounted for free swinging movement in a rearward direction and being held against swinging movement in the opposite direction.

17. Apparatus as defined in claim 16 wherein said pushing means includes a reciprocating portion adapted to reciprocate in a direction forwardly and rearwardly of the gathering device, said spaced members being swingably supported on said reciprocating portion.

18. Apparatus as defined in claim 11 wherein said pushing means includes a resilient body having a plurality of projections extending therefrom.

19. Apparatus as defined in claim 11 wherein said pushing means includes an endless belt having a plurality of spaced projections formed thereon.

20. Apparatus as defined in claim 11 wherein said conveyor means is inclined upwardly and rearwardly.

21. Apparatus as defined in claim 11 wherein said conveyor means is moved at a faster linear speed than the linear speed of movement of said pushing means.

22. Apparatus as defined in claim 11 including a discharge portion supported by said support means and disposed adjacent the upper rear portion of said conveyor means for discharging birds downwardly from said conveyor means.

23. Apparatus as defined in claim 22 including further conveyor means comprising a first conveyor portion having a part thereof positioned beneath said discharge portion for receiving birds therefrom.

24. Apparatus as defined in claim 23 wherein said first conveyor portion is pivotally connected at one end thereof to said gathering device.

25. Apparatus as defined in claim 24 including a second conveyor portion adapted to extend to a vehicle, the opposite end of said first conveyor portion being movably operatively interconnected with said second conveyor portion.

* * * * *